(12) United States Patent
Sweers et al.

(10) Patent No.: US 11,975,869 B2
(45) Date of Patent: May 7, 2024

(54) LIGHTING SYSTEM INSPECTION USING AN UNMANNED AERIAL VEHICLE

(71) Applicant: THE BOEING COMPANY, Chicago, IL (US)

(72) Inventors: Gregory James Sweers, Renton, WA (US); James J. Troy, Issaquah, WA (US); Gary E. Georgeson, Tacoma, WA (US)

(73) Assignee: THE BOEING COMPANY, Arlington, VA (US)

( * ) Notice: Subject to any disclaimer, the term of this patent is extended or adjusted under 35 U.S.C. 154(b) by 96 days.

(21) Appl. No.: 17/661,623

(22) Filed: May 2, 2022

(65) Prior Publication Data

US 2023/0348109 A1 Nov. 2, 2023

(51) Int. Cl.
  *B64F 5/60* (2017.01)
  *B64C 39/02* (2023.01)
  *B64D 47/02* (2006.01)
  *G01M 11/02* (2006.01)
  *G06T 7/00* (2017.01)
  (Continued)

(52) U.S. Cl.
  CPC .............. *B64F 5/60* (2017.01); *B64C 39/024* (2013.01); *B64D 47/02* (2013.01); *G01M 11/0228* (2013.01); *G06T 7/0004* (2013.01); *G06V 10/60* (2022.01); *G08G 5/003* (2013.01);
  (Continued)

(58) Field of Classification Search
  None
  See application file for complete search history.

(56) References Cited

U.S. PATENT DOCUMENTS 5,422,716 A * 6/1995 Dempsey .................. G01J 1/42
356/218
7,643,893 B2 1/2010 Troy et al.
(Continued)

FOREIGN PATENT DOCUMENTS

EP         3816045 A1    5/2021
WO      2022001748 A1    1/2022
WO   WO-2023159323 A1 *  8/2023

OTHER PUBLICATIONS

Partial European Search Report for application No. 23165676.0, pp. 1-13.
(Continued)

*Primary Examiner* — Peter D Nolan
*Assistant Examiner* — Michael F Whalen
(74) *Attorney, Agent, or Firm* — Moore IP Law

(57) ABSTRACT

A method includes obtaining, at an unmanned aerial vehicle, a flight plan for the unmanned aerial vehicle. The flight plan is based on an aircraft type of an aircraft to be inspected. The method also includes coordinating, with a lighting control device onboard the aircraft, activation of a particular exterior light of the aircraft based on the flight plan such that the particular exterior light activates or deactivates when a particular sensor of the one or more sensors is located (i.e., positioned and oriented) to perform a sensing operation on the particular exterior light. The method further includes performing the sensing operation on the particular exterior light using the particular sensor. The method also includes determining a functionality metric associated with the particular exterior light based on the sensing operation.

20 Claims, 6 Drawing Sheets

(51) Int. Cl.
  *G06V 10/60* (2022.01)
  *G08G 5/00* (2006.01)
  *B64U 101/30* (2023.01)

(52) U.S. Cl.
  CPC ....... *G08G 5/0069* (2013.01); *B64U 2101/30* (2023.01); *G06T 2207/30252* (2013.01)

(56) References Cited

U.S. PATENT DOCUMENTS

| | | |
|---|---|---|
| 7,859,655 B2 | 12/2010 | Troy et al. |
| 8,392,045 B2 * | 3/2013 | Vian ..................... B64F 5/60 434/30 |
| 9,470,658 B2 | 10/2016 | Troy et al. |
| 10,712,286 B1 | 7/2020 | Fetzer et al. |
| 11,079,760 B2 | 8/2021 | Hafenrichter et al. |
| 11,220,356 B2 | 1/2022 | Troy et al. |
| 2018/0120196 A1 | 5/2018 | Georgeson et al. |
| 2020/0039664 A1 | 2/2020 | Nicks |
| 2020/0182835 A1 | 6/2020 | Hafenrichter et al. |
| 2020/0361634 A1 * | 11/2020 | Gil ..................... B64U 80/30 |
| 2020/0377233 A1 * | 12/2020 | Harvey ................ B64D 47/02 |
| 2021/0055721 A1 | 2/2021 | Bethke et al. |
| 2021/0232141 A1 | 7/2021 | Georgeson et al. |
| 2021/0237381 A1 | 8/2021 | Hafenrichter et al. |
| 2021/0237867 A1 | 8/2021 | Georgeson et al. |
| 2022/0024577 A1 | 1/2022 | Stamatovski |

OTHER PUBLICATIONS

Extended European Search Report for application No. 23170897.5 dated Sep. 22, 2023, pp. 1-8.

\* cited by examiner

LIGHTING SYSTEM INSPECTION USING AN UNMANNED AERIAL VEHICLE

FIELD OF THE DISCLOSURE

The subject disclosure is generally related to inspections involving an unmanned aerial vehicle.

BACKGROUND

Aircraft have a plurality of exterior lights. As non-limiting examples, an aircraft typically has navigation and position lights, wing-tip strobe lights, wing lights, taxi lights, landing lights, runway turnoff lights, etc. Aircraft regulatory agencies require that the exterior lights be maintained onboard all operational aircraft. Typically, a mechanic (or inspector) physically inspects the condition of each exterior light of the aircraft when a problem is reported or during a preflight or postflight inspection. However, physically inspecting each exterior light can be a time-consuming task and can entail the use of specialized equipment, such as a boom lift or a scissor lift, which can lead to schedule conflicts, delays, and risk to personnel.

SUMMARY

As used herein, a "location" includes a three-dimensional "position" (such as x,y,z Cartesian coordinates) and a three-dimensional "orientation" (such as roll, pitch, and yaw angles).

In a particular implementation, an unmanned aerial vehicle includes communication circuitry, one or more sensors, and one or more processors coupled to the communication circuitry and the one or more sensors. The one or more processors are configured to obtain a flight plan for the unmanned aerial vehicle. The flight plan is based on an aircraft type of an aircraft to be inspected and lighting system configuration. The one or more processors are also configured to coordinate, with a lighting control device being part of a lighting system onboard the aircraft via the communication circuitry, activation of a particular exterior light of the aircraft based on the flight plan such that the particular exterior light activates or deactivates when a particular sensor of the one or more sensors is located to perform a sensing operation on the particular exterior light. The one or more processors are further configured to perform the sensing operation on the particular exterior light using the particular sensor. The one or more processors are also configured to determine a functionality metric associated with the particular exterior light based on the sensing operation.

In another particular implementation, a method includes obtaining, by an unmanned aerial vehicle, a flight plan for the unmanned aerial vehicle. The flight plan is based on an aircraft type and lighting system configuration of an aircraft to be inspected. The method also includes coordinating, with a lighting control device onboard the aircraft, activation of a particular exterior light of the aircraft based on the flight plan such that the particular exterior light activates or deactivates when a particular sensor of the one or more sensors is located to perform a sensing operation on the particular exterior light. The method further includes performing the sensing operation on the particular exterior light using the particular sensor. The method also includes determining a functionality metric associated with the particular exterior light based on the sensing operation.

In another particular implementation, a non-transitory computer-readable medium instructions, when executed by one or more processors, cause the one or more processors to obtain a flight plan for an unmanned aerial vehicle. The flight plan is based on an aircraft type of an aircraft to be inspected and lighting system configuration. The instructions, when executed by the one or more processors, further cause the one or more processors to coordinate, with a lighting control device onboard the aircraft, activation of a particular exterior light of the aircraft based on the flight plan such that the particular exterior light activates or deactivates when a particular sensor of the one or more sensors is located to perform a sensing operation on the particular exterior light. The instructions, when executed by the one or more processors, also cause the one or more processors to perform the sensing operation on the particular exterior light using the particular sensor. The instructions, when executed by the one or more processors, further cause the one or more processors to determine a functionality metric associated with the particular exterior light based on the sensing operation.

The features, functions, and advantages described herein can be achieved independently in various implementations or can be combined in yet other implementations, further details of which can be found with reference to the following descriptions and drawings.

DETAILED DESCRIPTION

Figure 1A:
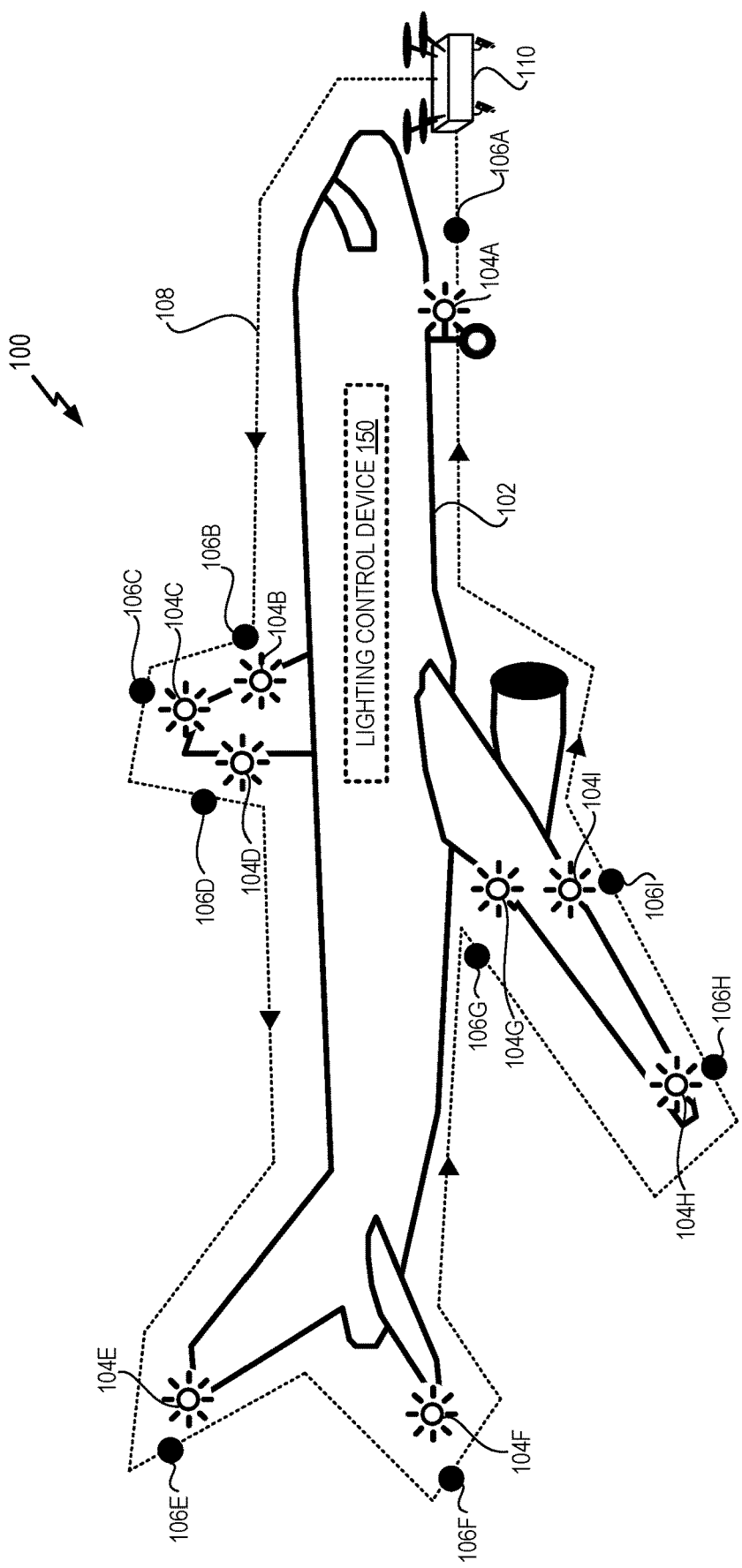
FIG. 1A is a diagram that illustrates an example of an environment that includes an unmanned aerial vehicle configured to inspect exterior lights of an aircraft.

Aspects disclosed herein present example systems and methods for inspecting exterior lights of an aircraft using an unmanned aerial vehicle. For example, when an aircraft is to be inspected, the unmanned aerial vehicle can obtain a flight plan based on an aircraft type (or model) of the aircraft. Based on the flight plan, the unmanned aerial vehicle can travel (e.g., fly) around a perimeter of the aircraft and inspect the exterior lights of the aircraft. In particular, the flight plan can indicate a flight path for the unmanned aerial vehicle to travel associated with a particular aircraft lighting configuration. At different locations (which include both positions and orientations) along the flight path, the unmanned aerial vehicle can inspect different exterior lights of the aircraft. To illustrate, when the unmanned aerial vehicle is at a first location on the flight path, the unmanned aerial vehicle can inspect a first exterior light of the aircraft. Additionally, when the unmanned aerial vehicle is at a second location on the flight path, the unmanned aerial vehicle can inspect a second exterior light of the aircraft.

To inspect the exterior lights, the unmanned aerial vehicle can be configured to coordinate, with a lighting control system onboard the aircraft, activation or deactivation of the exterior lights. For example, the unmanned aerial vehicle can generate coordination data based on the flight plan and send the coordination data to the lighting control system onboard the aircraft. According to one implementation, the coordination data can indicate that the unmanned aerial vehicle is at the first location to perform a sensing operation on the first exterior light. In response to receiving the coordination data, the lighting control system onboard the aircraft can control the first exterior light to enable the unmanned aerial vehicle to perform the sensing operation. For example, the lighting control system onboard the aircraft can activate the first exterior light, and a camera associated with the unmanned aerial vehicle can capture an image of the activated light. Alternatively, or in addition, the lighting control system onboard the aircraft can deactivate the first exterior light, and the camera associated with the unmanned aerial vehicle can capture another image of the deactivated light.

The unmanned aerial vehicle can perform image processing operations on the captured images to inspect the first exterior light. As a non-limiting example, based on the captured images, the unmanned aerial vehicle can determine whether the first exterior light properly activates, whether the first exterior light properly deactivates, whether there are any cracks in the lens of the first exterior light, or in some cases, whether the light strobe mechanism is operating. In some implementations, the unmanned aerial vehicle can include other sensors that are used to inspect the first exterior light. As a non-limiting example, the unmanned aerial vehicle can include a light intensity measuring sensor to inspect a light intensity of the first exterior light. After the unmanned aerial vehicle inspects the first exterior light, the unmanned aerial vehicle can travel to the second location to inspect the second exterior light in a similar manner.

By using the unmanned aerial vehicle to automate inspection of the exterior lights, human physical inspection of the exterior lights can be bypassed. As a result, humans (e.g., technicians) are not subject to dangerous safety conditions that are associated with manually inspecting the lights using special tooling otherwise required to inspect the exterior lights. Additionally, the use of the unmanned aerial vehicle can result in rapid, precise, repeatable, and safer aircraft lighting inspections.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1A, multiple exterior lights are illustrated and associated with reference numbers 104A, 104B, 104C, etc. When referring to a particular one of these exterior lights, such as the exterior light 104A, the distinguishing letter "A" is used. However, when referring to any arbitrary one of these exterior lights or to these exterior lights as a group, the reference number 104 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1A depicts an unmanned aerial vehicle 110 with one or more processors ("processor(s)" 120 in FIG. 1A), which indicates that in some implementations the unmanned aerial vehicle 110 includes a single processor 120 and in other implementations the unmanned aerial vehicle 110 includes multiple processors 120. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1A depicts an example of an environment 100 that includes an unmanned aerial vehicle configured to inspect exterior lights of an aircraft 102. For example, in FIG. 1A, an unmanned aerial vehicle 110 is configured to travel (e.g., fly) around an aircraft 102 and inspect exterior lights 104 of the aircraft 102 to determine whether the exterior lights 104 are functioning properly.

To illustrate, the aircraft 102 includes a plurality of exterior lights 104. For example, in FIG. 1A, the aircraft 102 includes an exterior light 104A, an exterior light 104B, an exterior light 104C, and exterior light 104D, an exterior light 104E, an exterior light 104F, an exterior light 104G, an exterior light 104H, and an exterior light 104I. Although nine exterior lights 104 are illustrated in FIG. 1A, in other implementations, the aircraft 102 can include additional or fewer exterior lights 104. As a non-limiting example, according to one implementation, the aircraft 102 can include thirty exterior lights 104. According to another implementation, the aircraft 102 can include five exterior lights 104.

The number of exterior lights 104 can be based on an aircraft type or an aircraft model. For example, a first type (or model) of aircraft can have a first number of exterior lights 104, and a second type (or model) of aircraft can have a second number of exterior lights that is different from the first number of exterior lights 104. Additionally, the location of the exterior lights 104 can be based on the aircraft type (or model). For example, the first type of aircraft can have a first number of exterior lights 104 that are located according to a first pattern, and the second type of aircraft can have a second number of exterior lights 104 that are located according to a second pattern. As described below, a flight plan 130 for the unmanned aerial vehicle 110 can be based on an aircraft type (e.g., the aircraft type 312 of FIG. 3) of the aircraft 102.

The aircraft 102 can include one or more devices 150 onboard. The lighting control device 150 onboard the aircraft 102 can provide aircraft information (e.g., the aircraft information 310 of FIG. 3) associated with the aircraft 102 to the unmanned aerial vehicle 110, control components of the aircraft 102 (e.g., control activation or deactivation of the exterior lights 104), execute commands generated by the unmanned aerial vehicle 110, or a combination thereof. The lighting control device 150 onboard the aircraft 102 can correspond to one or more controllers, one or more processors, one or more computers, one or more systems, one or more other devices, or a combination thereof.

Figure 1B:
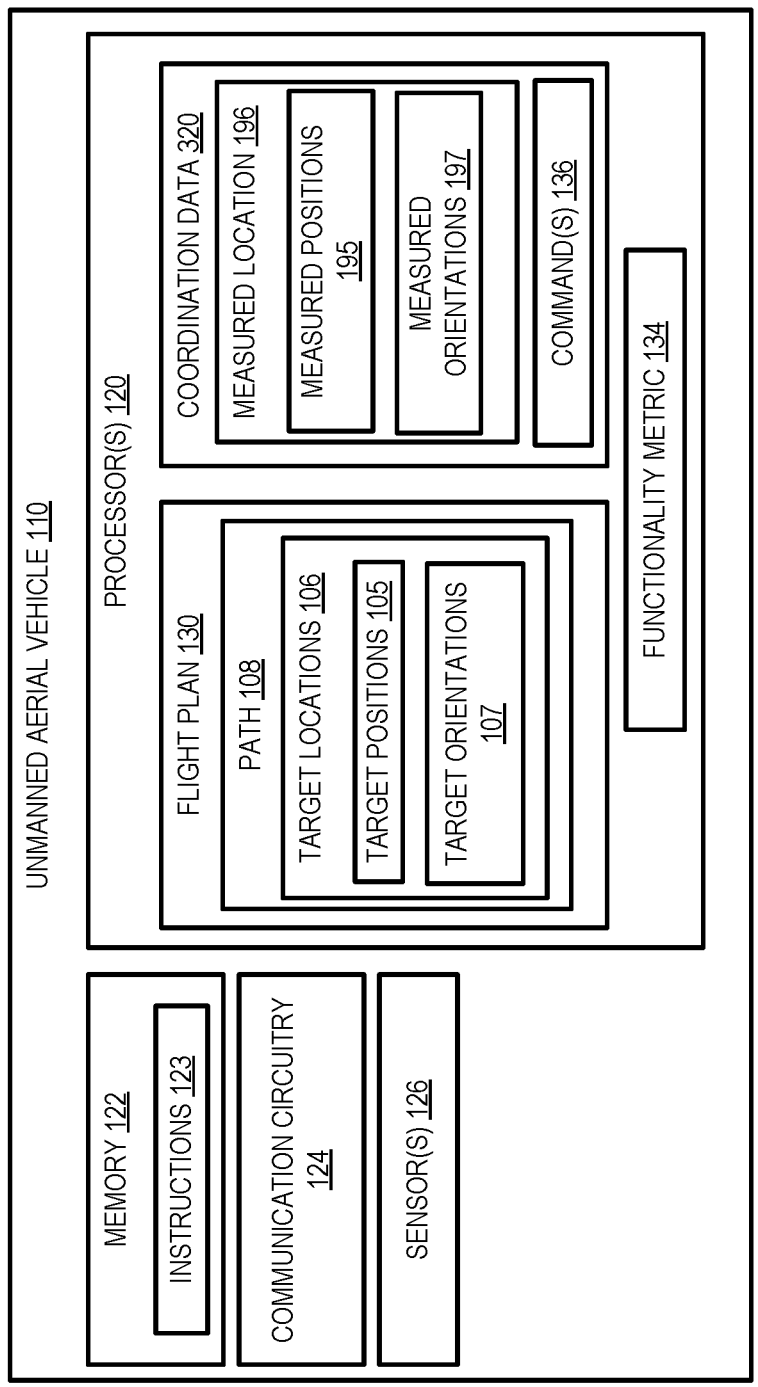
FIG. 1B is a block diagram of an unmanned aerial vehicle configured to inspect exterior lights of an aircraft.

FIG. 1B depicts a block diagram of the unmanned aerial vehicle 110. The unmanned aerial vehicle 110 includes one or more processors 120, a memory 122 coupled to the one or more processors 120, communication circuitry 124 coupled to the one or more processors 120, and one or more sensors 126 coupled to the one or more processors 120. The memory 122 can correspond to a non-transitory computer-readable storage medium that stores instructions 123. The instructions 123 are executable by the processor 120 to perform the operations described herein. The communication circuitry 124 can include one or more wireless transceivers, receivers, transmitters, antennas, radios, etc. that are used to communicate with the lighting control device 150 onboard the aircraft 102.

The processor 120 can be configured to obtain the flight plan 130 for the unmanned aerial vehicle 110. The flight plan 130 indicates a path 108 for the unmanned aerial vehicle 110 to travel around the aircraft 102 while inspecting the exterior lights 104. For example, the flight plan 130 indicates target locations 106 along the path 108 for the unmanned aerial vehicle 110 to perform sensing operations, as described in greater detail below. Each target location 106 corresponds to a target position 105 and a target orientation 107 along the path 108 that enables the unmanned aerial vehicle 110 to perform a sensing operation on a corresponding exterior light 104.

To illustrate, the flight plan 130 can indicate that the unmanned aerial vehicle 110 is to perform a first sensing operation on the exterior light 104A when the unmanned aerial vehicle 110 is at a location 106A on the path 108. Typically, the location 106A can be offset from exterior light 104A by a specified distance (such as one meter) in a specific direction (such as normal to the surface) to avoid contact between unmanned aerial vehicle 110 and aircraft 102. In a similar manner, the flight plan 130 can indicate that the unmanned aerial vehicle 110 is to perform a second sensing operation on the exterior light 104B when the unmanned aerial vehicle 110 is at a location 106B on the path 108, perform a third sensing operation on the exterior light 104C when the unmanned aerial vehicle 110 is at a location 106C on the path 108, perform a fourth sensing operation on the exterior light 104D when the unmanned aerial vehicle 110 is at a location 106D on the path 108, perform a fifth sensing operation on the exterior light 104E when the unmanned aerial vehicle 110 is at a location 106E on the path 108, perform a sixth sensing operation on the exterior light 104F when the unmanned aerial vehicle 110 is at a location 106F on the path 108, perform a seventh sensing operation on the exterior light 104G when the unmanned aerial vehicle 110 is at a location 106G on the path 108, perform an eighth sensing operation on the exterior light 104H when the unmanned aerial vehicle 110 is at a location 106H on the path 108, and perform a ninth sensing operation on the exterior light 104I when the unmanned aerial vehicle 110 is at a location 106I on the path 108.

According to one implementation, the processors 120 can obtain the flight plan 130 for unmanned aerial vehicle 110 from a remote device. For example, a remote device can send a copy of the flight plan 130 to unmanned aerial vehicle 110. Thus, in this implementation, the flight plan 130 can be a precomputed flight plan received and used by the unmanned aerial vehicle 110. In some scenarios, the remote device that communicates the flight plan 130 to the unmanned aerial vehicle 110 can be a computer on the aircraft 102. In other scenarios, the remote device that communicates the flight plan 130 to the unmanned aerial vehicle 110 can be another computer or mobile device, such as a computer at an aircraft control center.

According to one implementation, the processor 120 can obtain the flight plan 130 for unmanned aerial vehicle 110 based on the aircraft information from the lighting control device 150 onboard the aircraft 102, or from some other device that has a copy of the flight plan 130. To illustrate, the lighting control device 150 onboard the aircraft 102 can send the aircraft information 310 of FIG. 3, to the unmanned aerial vehicle 110, indicating the aircraft type 312 of the aircraft 102. The flight plan 130 can be tailored to the dimensions, layout, and exterior light placement for the aircraft type 312 indicated by the lighting control device 150 onboard the aircraft 102. Based on the aircraft information 310, the processor 120 can access the flight plan 130 for the aircraft 102 from a database of flight plans for different aircraft types. Alternatively, the lighting control device 150 onboard the aircraft 102 can include the flight plan 130 in the aircraft information 310 sent to the unmanned aerial vehicle 110.

According to another implementation, the processor 120 can obtain the flight plan 130 based on input data provided by a technician or crewmember. For example, an individual can use a user interface (not shown) to select the aircraft type of the aircraft 102 from a selection menu. Based on the selection, the processor 120 can access the flight plan 130 from the database of flight plans. Alternatively, the individual can upload the flight plan 130 to the unmanned aerial vehicle 110. It should be understood that the above examples of obtaining the flight plan 130 are merely for illustrative purposes and, in other implementations, the processor 120 can obtain the flight plan 130 using different techniques.

Based on the flight plan 130, the processor 120 can be configured to coordinate activation or deactivation of different exterior lights 104 with the lighting control device 150 onboard the aircraft 102 such that a particular exterior light 104 activates or deactivates when a particular sensor 126 of the unmanned aerial vehicle 110 is located to perform a sensing operation on the particular exterior light 104. To illustrate, when the particular sensor 126 of the unmanned aerial vehicle 110 is at the location 106A (e.g., positioned and oriented) to perform the sensing operation on the particular exterior light 104A, the processor 120 can coordinate with the lighting control device 150 to control (e.g., activate, deactivate, or both in sequence) the exterior light 104A such that the unmanned aerial vehicle 110 can perform sensing operations on the exterior light 104A. According to one implementation, the processor 120 can determine that the unmanned aerial vehicle 110 is at the location 106A if a measured location 196 of the unmanned aerial vehicle 110 is within an allowable range of the location 106A. For example, if the distance between the target position 105 associated with the location 106A and a measured position 195 of the unmanned aerial vehicle 110 is within a threshold distance, the processor 120 can determine that the unmanned aerial vehicle 110 is at the position of location 106A. Similarly, the processor 120 can determine that the unmanned aerial vehicle 110 is oriented to perform the sensing operation if a measured orientation 197 of the unmanned aerial vehicle 110 at location 106A is within a threshold range of angles of the target orientation 107. As described below, the processor 120 can generate and send coordination data 320 to the lighting control device 150 onboard the aircraft 102 to coordinate activation or deactivation of the exterior lights 104 with the lighting control device 150.

According to another implementation, to coordinate activation or deactivation of the exterior light 104A, the processor 120 can be configured to determine, based on the flight plan 130, that the sensor 126 is at the location 106A (i.e., positioned and oriented) to perform a sensing operation on the exterior light 104A. For example, the processor 120 can determine whether the unmanned aerial vehicle 110 is at the target position 105 associated with the location 106A and has the target orientation 107 that enables the sensor 126 to perform the sensing operation on the first exterior light 104A. In response to a determination that the sensor 126 is located (within an acceptable range of possible locations, i.e., sets of position and orientation values) to perform the sensing operation on the exterior light 104A, the processor 120 can be configured to communicate to the lighting control device 150 onboard the aircraft 102 to activate or deactivate the exterior light 104A. For example, the processor 120 can use the communication circuitry 124 to send one or more commands 136 that instructs the lighting control device 150 to activate or deactivate the exterior light 104A in response to a determination that the unmanned aerial vehicle 110 is at the location 106A.

According to one implementation, to coordinate activation or deactivation of the exterior light 104A, the processor 120 can be configured to determine, based on the flight plan 130, one or more time windows that indicate when the sensor 126 will be located (positioned and oriented) to perform a sensing operation on different exterior lights 104. As another non-limiting example, the processor 120 can identify a time window when the unmanned aerial vehicle 110 will be at the location 106A to perform a sensing operation on the exterior light 104A. The time window can be included in the coordination data 320 sent to the lighting control device 150. Based on the identified time window, the lighting control device 150 can activate or deactivate the exterior light 104A during the time window for sensing operations. Thus, according to the above implementation, the processor 120 will have information about the time window when the unmanned aerial vehicle 110 is expected to be at the location 106A and communicate to the lighting control device 150 to activate or deactivate the exterior light 104 during the time window 132.

The processor 120 can be configured to perform a sensing operation on the exterior light 104A using the sensor 126. According to one implementation, at least one of the sensors 126 can correspond to a camera. In this implementation, to perform the sensing operation, the processor 120 can initiate an image capture operation to enable the sensor 126 to capture one or more images of the exterior light 104A while the unmanned aerial vehicle 110 is at the location 106A to perform the sensing operation on the exterior light 104A. In some scenarios, the sensor 126 can capture a first image of the exterior light 104A when the lighting control device 150 onboard the aircraft 102 activates the exterior light 104A and can capture a second image of the exterior light 104A when the lighting control device 150 onboard the aircraft 102 deactivates the exterior light 104A. As a result, during the sensing operation, the unmanned aerial vehicle 110 can capture images of the exterior light 104A while activated and can capture images of the exterior light 104A while deactivated.

The processor 120 can also be configured to determine a functionality metric 134 associated with the exterior light 104A based on the sensing operation. According to the above-described implementation where the sensor 126 corresponds to a camera, the functionality metric 134 can indicate whether the exterior light 104A is not functioning as intended. For example, the processor 120 can perform image processing operations on the images captured by sensor 126 to determine whether the exterior light 104A is not functioning as intended. According to one implementation, the functionality metric 134 can be indicated by a particular value within a range of values that indicate a degree to which the exterior light 104A is properly functioning.

According to one implementation, at least one of the sensors 126 can correspond to a light intensity measuring sensor. In this implementation, to perform the sensing operation, the processor 120 can initiate a light intensity measurement associated with the exterior light 104A. For example, when the exterior light 104A is activated, the sensor 126 can convert light energy associated with the exterior light 104A into an electrical signal output. In some implementations, the sensor 126 can include phototransistors, photoresistors, photodiodes, or a combination thereof, to convert the light energy into the electrical signal output. The processor 120 can determine the functionality metric 134 based on the electrical signal output. For example, the functionality metric 134 can indicate an intensity of the exterior light 104A. The processor 120 can determine the intensity of the exterior light 104A based on characteristics (e.g., an amplitude) of the electrical signal output.

According to one implementation, at least one of the sensors 126 can correspond to a laser-based sensor. In this implementation, the sensing operation can correspond to a light refraction test to generate the functionality metric 134. For example, the functionality metric 134 can indicate whether there is light assembly degradation, such as a cracked lens, based on the light refraction test.

Similar operations can be performed to inspect the other exterior lights 104B-104I of the aircraft 102. For example, the processor 120 can coordinate, with the lighting control device 150 onboard the aircraft 102, activation or deactivation of the other exterior lights 104B-104I to perform similar sensing operations when the unmanned aerial vehicle 110 is in a corresponding locations 106B-106I. According to one implementation and in a similar manner as described with respect to the exterior light 104A, to coordinate activation or deactivation of the other exterior lights 104B-104I, the processor 120 can be configured to determine, based on the flight plan 130, time windows 132 when the sensor 126 will be positioned and oriented to perform a sensing operation on the corresponding exterior lights 104B-104I. According to another implementation and in a similar manner as described with respect to the exterior light 104A, to coordinate activation or deactivation of the other exterior lights 104B-104I, the processor 120 can be configured to determine, based on the flight plan 130, that the sensor 126 is in the specified location to perform a sensing operation on the particular exterior light 104B-104I and send a command 136 that instructs the lighting control device 150 to activate or deactivate the particular exterior light 104B-104I to perform a sensing operation on the particular exterior light 104B-104I.

According to the above-described implementations, activation or deactivation of a particular exterior light 104 for inspection is coordinated between the unmanned aerial vehicle 110 and the lighting control device 150 onboard the aircraft 102 based on the location 106 of the unmanned aerial vehicle 110 on the flight path 108. For example, when the unmanned aerial vehicle 110 travels to the location 106A, the unmanned aerial vehicle 110 coordinates with the lighting control device 150 onboard the aircraft 102 to activate or deactivate the exterior light 104A, thus enabling the processor 120 to perform sensing operations and inspect the exterior light 104A. After sensing operations are performed, the unmanned aerial vehicle 110 travels to the location 106B and coordinates with the lighting control device 150 onboard the aircraft 102 to activate or deactivate the exterior light 104B to perform similar sensing operations.

However, in some implementations, coordination between the unmanned aerial vehicle 110 and the lighting control device 150 onboard the aircraft 102 can result in the activation (or deactivation) of multiple exterior lights 104 while the unmanned aerial vehicle 110 travels around the aircraft 102 to inspect the exterior lights 104. To illustrate, the processor 120 can be configured to initiate a first flight around the aircraft 102 based on the flight plan 130. During the first flight around the aircraft 102, the processor 120 can communicate to the lighting control device 150 onboard the aircraft 102 to deactivate multiple or all of the exterior lights 104. As a result, during the first flight around the aircraft 102, the processor 120 can perform sensing operations on one or more of the deactivated exterior lights 104A-104I when the unmanned aerial vehicle 110 is in a corresponding location 106A-106I. Based on the sensing operations, the processor 120 can determine functionality metrics 134 for the deactivated exterior lights 104. As a non-limiting example, the functionality metrics 134 can indicate which, if any, exterior lights 104 have readily identifiable cracks.

After performing the sensing operations during the first flight, the processor can be configured to initiate a second flight around the aircraft 102 based on the flight plan 130. During the second flight around the aircraft 102, the processor 120 can communicate to the lighting control device 150 onboard the aircraft 102 to activate multiple (or all of the) exterior lights 104. As a result, during the second flight around the aircraft 102, the processor 120 can perform sensing operations on one or more of the activated exterior lights 104A-104I when the unmanned aerial vehicle 110 is in a corresponding location 106A-106I. Based on the sensing operations, the processor 120 can determine functionality metrics 134 for the activated exterior lights 104. As a non-limiting example, the functionality metrics 134 can indicate the intensity of each exterior light 104.

In some implementations, the unmanned aerial vehicle 110 can inspect electronic window shades associated with the aircraft 102. For example, cabin lights within the aircraft 102 can be activated at night to provide background lighting. During the first flight around the aircraft 102, the lighting control device 150 can set the electronic window shades to a high transparency level (e.g., a maximum transparency) and the unmanned aerial vehicle 110 can use sensors to detect a first amount of light transmitted through each electronic window shade. During the second flight around the aircraft 102, the lighting control device 150 can set the electronic window shades to a low transparency level (e.g., a minimum transparency) and the unmanned aerial vehicle 110 can use sensors to detect a second amount of light transmitted through each electronic window shade. For a particular window shade, if the difference between the first amount of light and the second amount of light fails to satisfy an expected difference, the unmanned aerial vehicle 110 can notify a maintenance team member with information about which window shade and/or interior light was not performing properly.

According to some implementations, an authentication process between the aircraft 102 and the unmanned aerial vehicle 110 can occur prior to the processor 120 coordinating with the lighting control device 150 onboard the aircraft 102. As a non-limiting example, an exchange of messages between the aircraft 102 and the unmanned aerial vehicle 110 can be used to provide permission for the unmanned aerial vehicle 110 to coordinate with the lighting control device 150. As a result, the authentication process can reduce the likelihood of unauthorized access to components of the aircraft 102, such as the lighting control device 150.

The techniques described with respect to FIGS. 1A-1B enable automated inspection of the exterior lights 104 of the aircraft 102 using the unmanned aerial vehicle 110. For example, using the onboard light-detecting sensors 126, the unmanned aerial vehicle 110 can travel the flight path 108 to capture and process images of the exterior lights 104. The processed images can be used to inspect the exterior lights 104 for malfunctions and damage. As a result, the techniques provide for rapid, precise, repeatable, and safer aircraft lighting inspections. For example, human physical inspection of the exterior lights 104 can be bypassed with the techniques described with respect to FIGS. 1A-1B. As a result, humans (e.g., mechanics, inspectors, etc.) are not subject to dangerous safety conditions that are associated with manually inspecting the lights using special tooling otherwise required to inspect the exterior lights 104.

Figure 2:
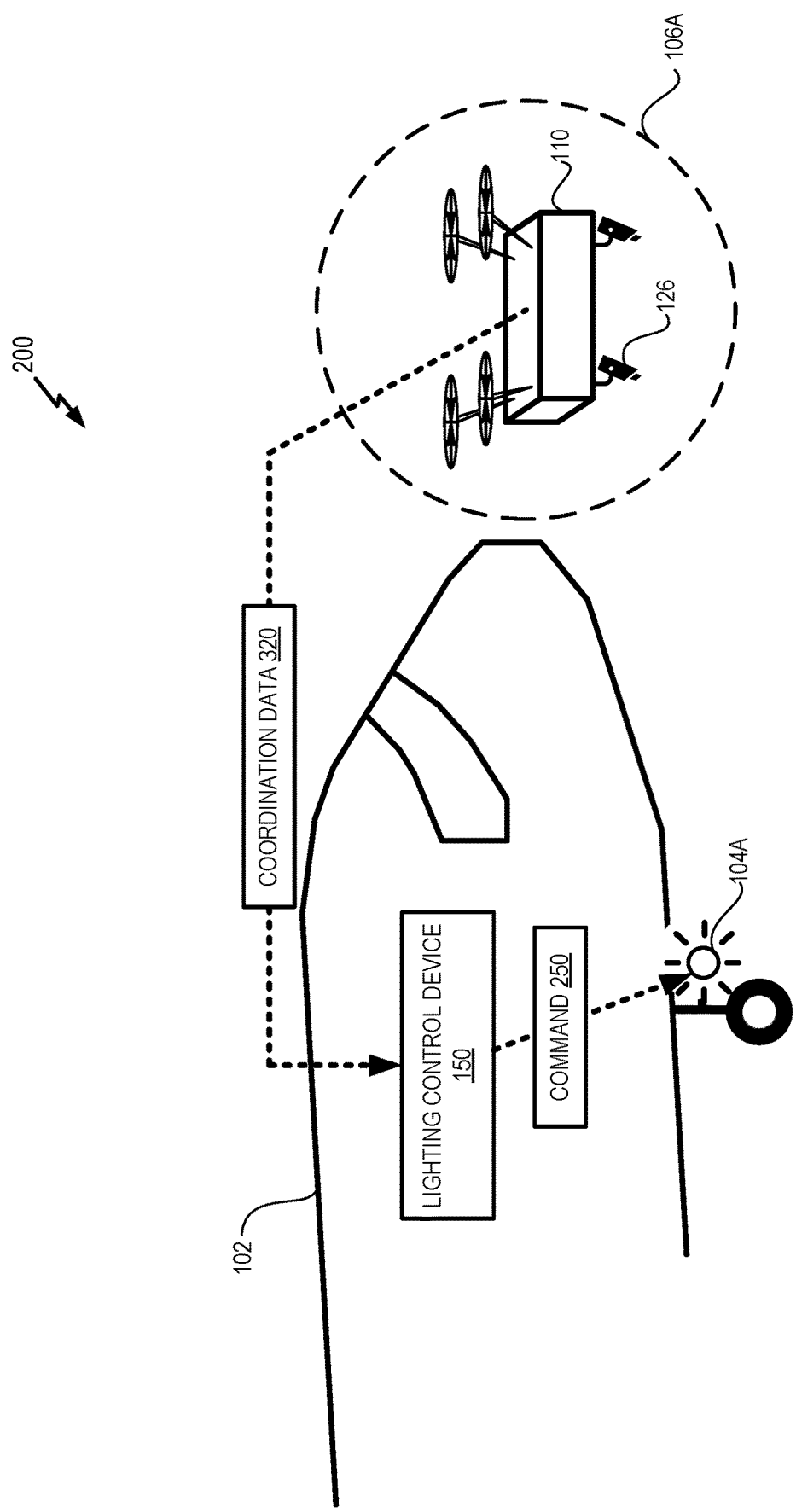
FIG. 2 is a diagram that illustrates an example of coordinating activation of exterior lights of an aircraft with a location of an unmanned aerial vehicle.

FIG. 2 illustrates an example 200 of coordinating activation of exterior lights of an aircraft with a location of an unmanned aerial vehicle. According to the example 200 of FIG. 2, the unmanned aerial vehicle 110 is at the location 106A to perform the sensing operation on the exterior light 104A. As a non-limiting example, the sensor 126 of the unmanned aerial vehicle 110 is located to capture images of the exterior light 104A that are used to determine a corresponding functionality metric 134.

In FIG. 2, the unmanned aerial vehicle 110 sends the coordination data 320 to the lighting control device 150 onboard the aircraft 102. Based on the coordination data 320, the lighting control device 150 onboard the aircraft 102 can send a command 250 (e.g., a deactivate command, an activate command, or both) to the exterior light 104A. For example, based on the command 250, the exterior light 104A deactivates, activates, flickers, etc., to enable the unmanned aerial vehicle 110 to perform sensing operations. Flicker can be detected by capturing a short video of the exterior light 104A in an active state, as opposed to by capturing a single image of the exterior light 104A.

Figure 3:
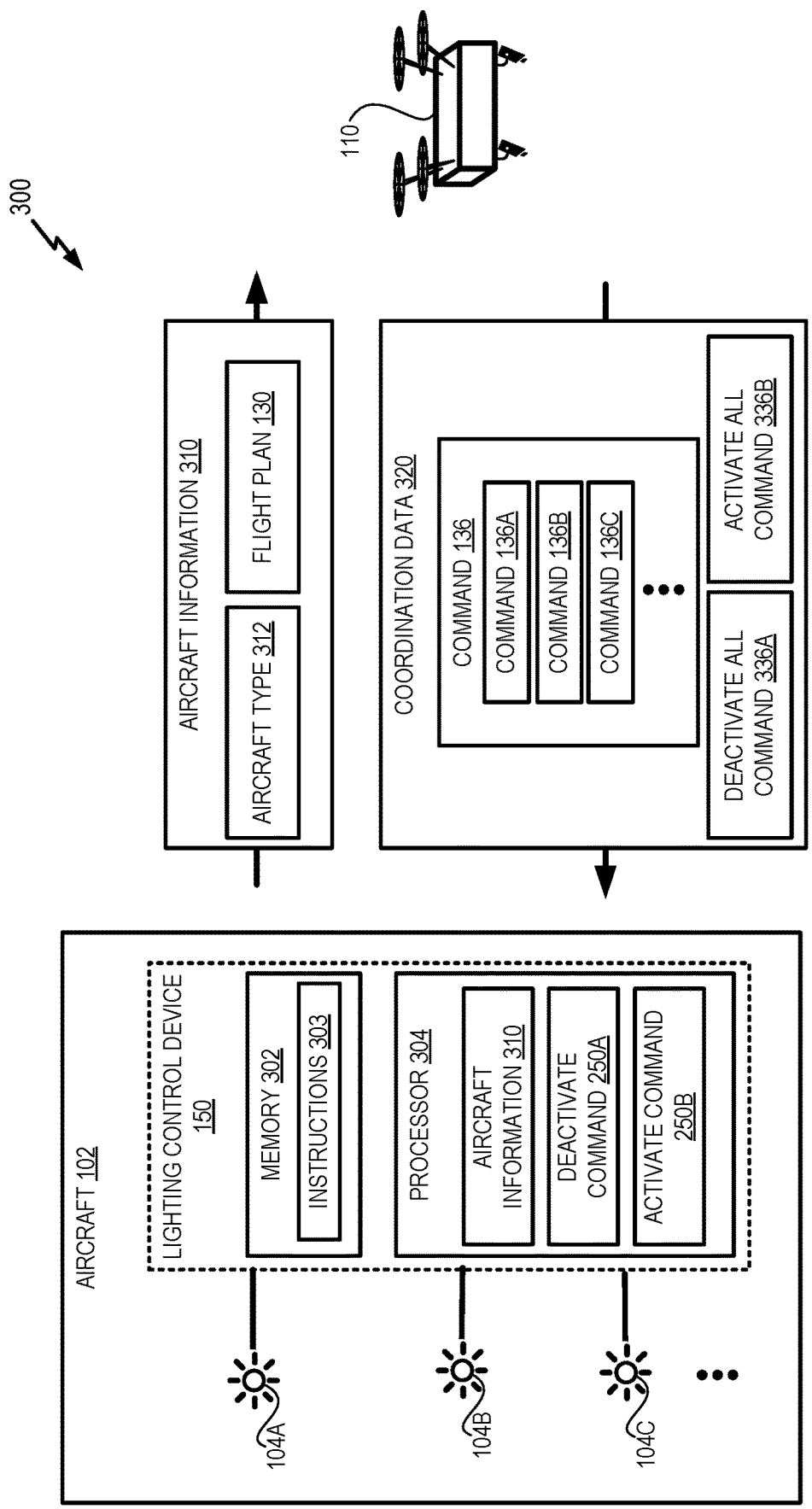
FIG. 3 depicts an example of coordinating activation of exterior lights of an aircraft with a position and orientation of an unmanned aerial vehicle.

FIG. 3 depicts an example 300 of coordinating activation of aircraft exterior lights with a location of an unmanned aerial vehicle. In the example 300 of FIG. 3, the aircraft 102 and the unmanned aerial vehicle 110 exchange information to coordinate activation of the aircraft exterior lights 104 and the location of the unmanned aerial vehicle 110.

In the example 300 of FIG. 3, the lighting control device 150 onboard the aircraft 102 corresponds to a controller or system that is configured to activate or deactivate the exterior lights 104 of the aircraft 102. The lighting control device 150 onboard the aircraft 102 includes a memory 302 that is coupled to one or more processors 304. The memory 302 can correspond to a non-transitory computer-readable storage medium that stores instructions 303. The instructions 303 are executable by the processor 304 to perform the operations described herein. The processor 304 can be configured to generate aircraft information 310 associated with the aircraft 102. The aircraft information 310 can include data that indicates an aircraft type 312 of the aircraft 102, the flight plan 130, or both. Additionally, as described below, the processor 304 can generate a deactivate command 314 and an activate command 316. The deactivate command 314 and activate command 316 can be used to control the exterior lights 104 of the aircraft 102.

As illustrated in FIG. 3, the lighting control device 150 onboard the aircraft 102 can be configured to send the aircraft information 310 to the unmanned aerial vehicle 110. Based on the aircraft information 310, the unmanned aerial vehicle 110 can generate coordination data 320 that is usable to coordinate the location of the unmanned aerial vehicle 110 with an activation status of the exterior lights 104. For example, the processor 304 of the lighting control device 150 onboard the aircraft 102 can selectively activate or deactivate the exterior lights 104 based on the coordination data 320.

According to one implementation, the coordination data 320 can include commands 136 that indicate to activate or deactivate the particular exterior lights 104 based on the location comparisons, specifically, target positions 105 and orientations 107 as compared to the measured positions 195 and orientations 197, respectively, of the unmanned aerial vehicle 110. For example, the coordination data 320 can include a command 136A that instructs the processor 304 to activate or deactivate the exterior light 104A, a command 136B that instructs the processor 304 to activate or deactivate the exterior light 104B, a command 136C that instructs the processor 304 to activate or deactivate the exterior light 104C, etc.

Based on the received commands 136A-136C, the processor 304 can selectively activate or deactivate the exterior lights 104A-104C to enable the unmanned aerial vehicle 110 to perform sensing operations on the exterior lights 104A-104C when the unmanned aerial vehicle 110 is in a corresponding locations 106A-106C. For example, when the unmanned aerial vehicle 110 is at the location 106A to perform sensing operations on the exterior light 104A, the unmanned aerial vehicle 110 can send the command 136A to the lighting control device 150 onboard the aircraft 102. In response to receiving the command 136A, the processor 304 can generate the deactivate command 250A to deactivate the exterior light 104A, generate the activate command 250B to activate the exterior light 104A, or both. As a result, the unmanned aerial vehicle 110 can perform sensing operations on the deactivated exterior light 104A, perform sensing operations on the activated exterior light 104A, or both. In a similar manner, the unmanned aerial vehicle 110 can send the commands 136B, 136C to the lighting control device 150 onboard the aircraft 102 to when the unmanned aerial vehicle 110 is at the locations 106B, 106C to perform sensing operations on the exterior lights 104B, 104C, respectively. Thus, in the example 300 of FIG. 3, the commands 136 can be sent at different time instances based on comparisons between the target positions 105 and the measured positions 195 of the unmanned aerial vehicle 110, and based on comparisons between the target orientations 107 and the measured orientations 197 of the unmanned aerial vehicle 110.

According to some implementations, the unmanned aerial vehicle 110 can perform sensing operations for each of the exterior lights 104 in a deactivated state during a first flight around the aircraft 102. In such implementations, the coordination data 320 can include a "deactivate all" command 336A. In response to receiving a "deactivate all" command 336A, the processor 304 can send the deactivate command 250A to each exterior light 104 to enable the unmanned aerial vehicle 110 to perform sensing operations on each of the exterior lights 104 in a deactivated state during the first flight. The unmanned aerial vehicle can also perform sensing operations on each of the exterior lights 104 in an activated state during a second flight around the aircraft 102. In this implementation, the coordination data 320 can include an "activate all" command 336B. In response to receiving the activate all command 336B, the processor 304 can send the activate command 250B to each exterior light 104 to enable the unmanned aerial vehicle 110 to perform sensing operations on each of the exterior lights 104 in an activated state during the second flight.

The techniques described with respect to FIG. 3 enable automated inspection of the exterior lights 104 of the aircraft 102 using the unmanned aerial vehicle 110. For example, by sending the coordination data 320 to the aircraft 102, the unmanned aerial vehicle 110 can coordinate with the lighting control device 150 onboard the aircraft 102 to selectively activate the exterior lights 104 for inspection. As a result, the techniques provide for rapid, precise, repeatable, and safer aircraft lighting inspections. For example, human physical inspection of the exterior lights 104 can be bypassed with the techniques described with respect to FIG. 3. As a result, humans (e.g., mechanics, inspectors, etc.) are not subject to dangerous safety conditions that are associated with manually inspecting the lights using special tooling otherwise required to inspect the exterior lights 104.

Figure 4:
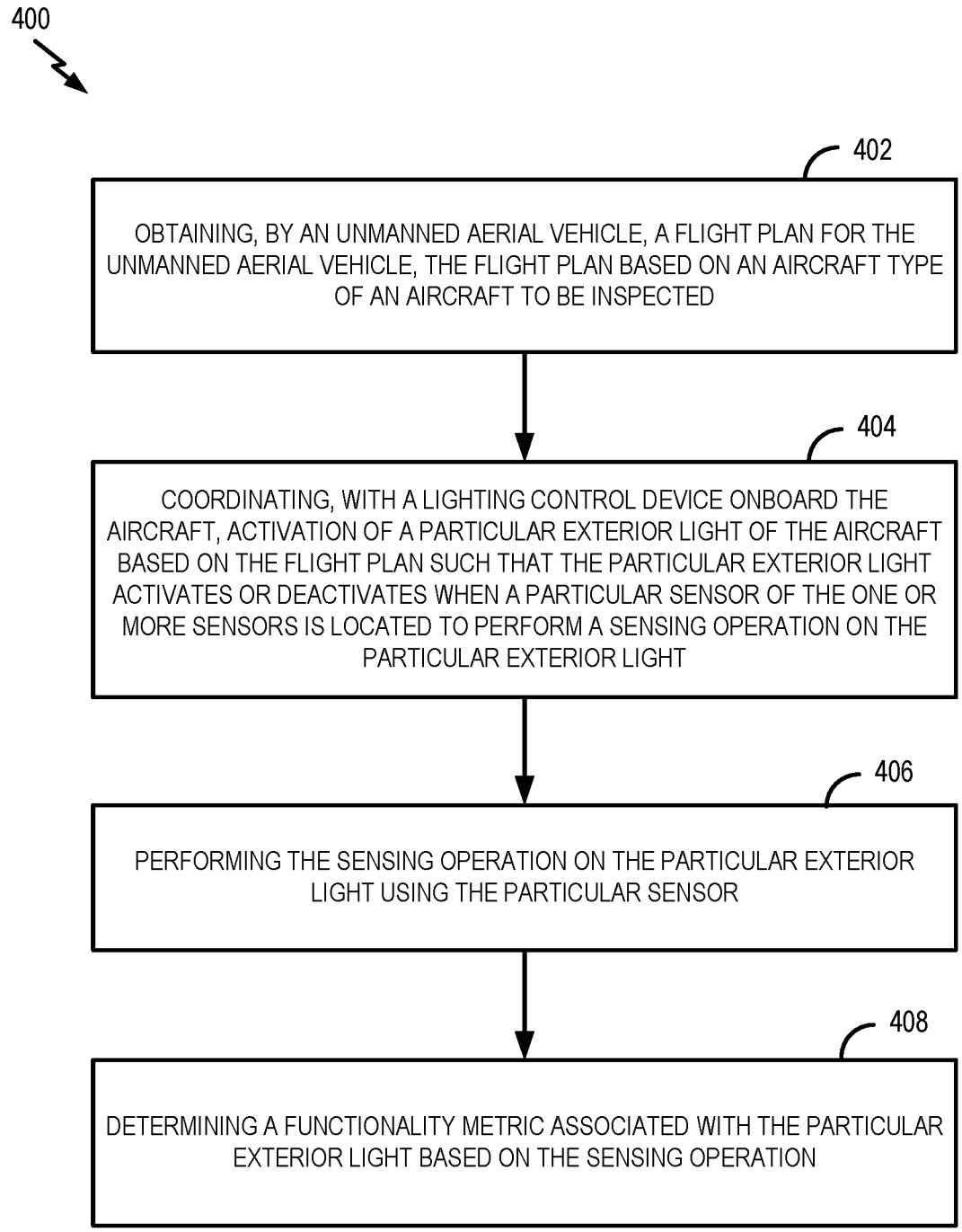
FIG. 4 is a flowchart of an example of a method of inspecting exterior lights of an aircraft using an unmanned aerial vehicle.

Referring to FIG. 4, a method of inspecting exterior lights of an aircraft using an unmanned aerial vehicle is shown and generally designated method 400. In a particular aspect, one or more operations of the method 400 are performed by the unmanned aerial vehicle 110.

The method 400 includes obtaining, at an unmanned aerial vehicle, a flight plan for the unmanned aerial vehicle, at block 402. The flight plan is based on an aircraft type of an aircraft to be inspected. For example, referring to FIG. 1B, the unmanned aerial vehicle 110 can obtain the flight plan 130. According to one implementation, the flight plan 130 can be obtained based on information from the lighting control device 150 onboard the aircraft 102. To illustrate, the lighting control device 150 onboard the aircraft 102 can send information, to the unmanned aerial vehicle 110, indicating the aircraft type of the aircraft 102. Based on the information, the processor 120 can access the flight plan 130 for the aircraft 102 from a database of flight plans for different aircraft types. Alternatively, the lighting control device 150 onboard the aircraft 102 can send the flight plan 130 to the unmanned aerial vehicle 110. According to another implementation, the processor 120 can obtain the flight plan 130 based on input from a technician or crewmember.

The method 400 also includes coordinating, with a lighting control device onboard the aircraft, activation of a particular exterior light of the aircraft based on the flight plan such that the particular exterior light activates or deactivates when a particular sensor of the one or more sensors is located to perform a sensing operation on the particular exterior light, at block 404. For example, referring to FIGS. 1A-1B, the unmanned aerial vehicle 110 can coordinate, with the lighting control device 150 onboard the aircraft 102, activation of the exterior light 104A based on the flight plan 130 such that the exterior light 104A activates and/or deactivates when the one or more sensors 126 are located (e.g., positioned and oriented) to perform a sensing operation on the exterior light 104A.

According to one implementation of the method 400, coordinating activation of the particular exterior light 104A based on the flight plan 130 includes determining, based on the flight plan 130, that the particular sensor 126 is positioned and oriented to perform the sensing operation for the particular exterior light 104A. In response to a determination that the particular sensor 126 is positioned and oriented to perform the sensing operation on the particular exterior light 104A, the method 400 can include communicating, to the lighting control device 150 onboard the aircraft 102, to activate the particular exterior light 104A. The method 400 may also include communicating to the lighting control device 150 onboard the aircraft to deactivate the particular exterior light 104A.

According to one implementation of the method 400, coordinating activation of the particular exterior light 104A based on the flight plan 130 includes determining, based on the flight plan 130, time window when the sensor 126 will be positioned and oriented to perform the sensing operation on the particular exterior light 104A. The method 400 can also include communicating, to the lighting control device 150 onboard the aircraft 102, to activate the particular exterior light 104A during the time window or deactivate the particular exterior light during the time window.

According to one implementation of the method 400, the unmanned aerial vehicle 110 can send different commands to the lighting control device 150 onboard the aircraft 102. As described above, the unmanned aerial vehicle 110 can send an activation command that instructs the lighting control device 150 to activate a particular exterior light 104 or a deactivation command that instructs the lighting control device 150 to deactivate the particular exterior light 104. Alternatively, or in addition, the unmanned aerial vehicle 110 can send a command that instructs the lighting control device 150 to activate a particular exterior light 104 for a designated time period (e.g., ten seconds) and deactivate the particular exterior light 140 after the designated time period expires. According to yet another implementation, the unmanned aerial vehicle 110 can send a command that instructs the lighting control device 150 to a plurality (or all) of the exterior lights 104. In such implementation, the lighting control device 150 can deactivate a particular exterior light 104 in response to receiving an indication from the unmanned aerial vehicle 110 that the particular exterior light 104 has been inspected.

According to one implementation of the method 400, coordinating activation of the particular exterior light 104A based on the flight plan 130 includes initiating a first flight (of the unmanned aerial vehicle 110) around the aircraft 102 based on the flight plan 130. The method 400 also includes communicating, to the lighting control device 150 onboard the aircraft 102, to deactivate the particular exterior light 104A during the first flight. The method 400 also includes initiating a second flight (of the unmanned aerial vehicle 110) around the aircraft based on the flight plan 130 after completion of the first flight. The method 400 also includes communicating, to the lighting control device 150 onboard the aircraft 102, to activate the particular exterior light 104A during the second flight.

The method 400 also includes performing the sensing operation on the particular exterior light using the particular sensor, at block 406. For example, referring to FIGS. 1A-1B, the unmanned aerial vehicle 110 can perform the sensing operation on the exterior light 104A using the one or more sensors 126. According to one implementation, the particular sensor 126 corresponds to a camera. In this implementation, the sensing operation can correspond to an image capture operation for capturing one or more images of the particular exterior light 104A. According to another implementation, the particular sensor 126 corresponds to a light intensity measuring sensor. In this implementation, the sensing operation corresponds to a light intensity measurement associated with the particular exterior light 104A. According to other implementations, the particular sensor 126 corresponds to a laser-based sensor. In such implementations, the sensing operation corresponds to a light refraction test.

The method 400 also includes determining a functionality metric associated with the particular exterior light based on the sensing operation, at block 408. For example, referring to FIGS. 1A-1B, the unmanned aerial vehicle 110 can determine the functionality metric 134 associated with the exterior light 104A based on the sensing operation. The functionality metric 134 can indicate whether the particular exterior light 104A is functional or an intensity of the particular exterior light 104A.

The method 400 described with respect to FIG. 4 enables automated inspection of the exterior lights 104 of the aircraft 102 using the unmanned aerial vehicle 110. For example, using the onboard light-detecting sensors 126, the unmanned aerial vehicle 110 can travel the flight path 108 to capture and process images of the exterior lights 104. The processed images can be used to inspect the exterior lights 104 for malfunctions and damage. As a result, the techniques provide for rapid, precise, repeatable, and safer aircraft lighting inspections. For example, human physical inspection of the exterior lights 104 can be bypassed with the techniques described with respect to the method 400. As a result, humans (e.g., mechanics, inspectors, etc.) are not subject to dangerous safety conditions that are associated with manually inspecting the lights using special tooling otherwise required to inspect the exterior lights 104.

Figure 5:
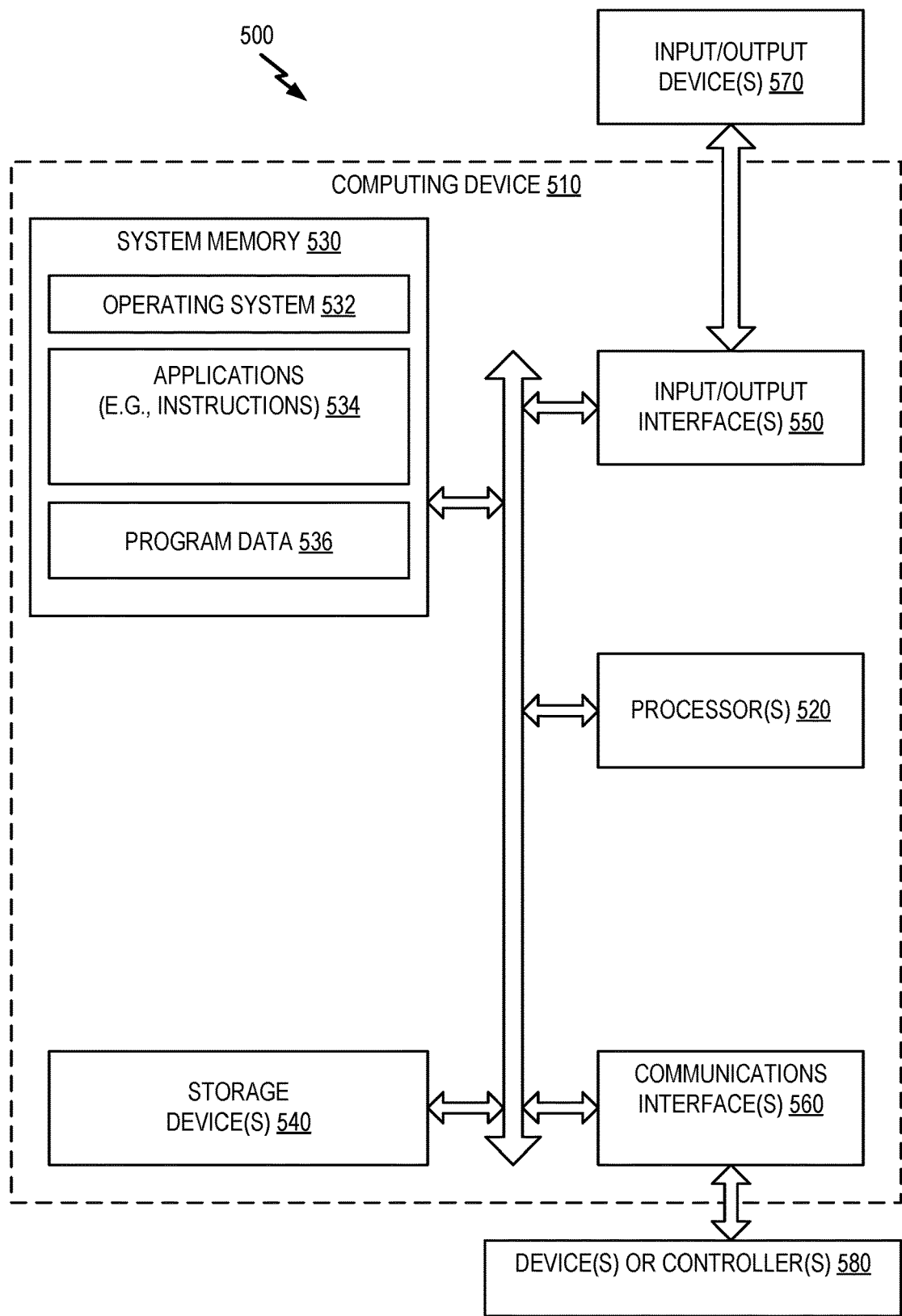
FIG. 5 is a block diagram of a computing environment including a computing device configured to support aspects of computer-implemented methods and computer-executable program instructions (or code) according to the subject disclosure.

FIG. 5 is a block diagram of a computing environment 500 including a computing device 510 configured to support aspects of computer-implemented methods and computer-executable program instructions (or code) according to the subject disclosure. For example, the computing device 510, or portions thereof, is configured to execute instructions to initiate, perform, or control one or more operations described with reference to FIGS. 1A-4. According to another implementation, the computing device 510 can correspond to the unmanned aerial vehicle 110.

The computing device 510 includes one or more processors 520. According to one implementation, the one or more processors 520 can correspond to the processor 120 of FIG. 1B. According to another implementation, the one or more processors 520 can be distinct from the processor 120 and can communicate with the processor 120 over a network. The processor(s) 520 are configured to communicate with system memory 530, one or more storage devices 540, one or more input/output interfaces 550, one or more communications interfaces 560, or any combination thereof. The system memory 530 includes volatile memory devices (e.g., random access memory (RAM) devices), nonvolatile memory devices (e.g., read-only memory (ROM) devices, programmable read-only memory, and flash memory), or both. The system memory 530 stores an operating system 532, which can include a basic input/output system for booting the computing device 510 as well as a full operating system to enable the computing device 510 to interact with users, other programs, and other devices. According to one implementation, the system memory 530 can correspond to the memory 122 of FIG. 1B. For example, the system memory 530 stores system (program) data 536, such as the data indicative of the flight plan 130. According to another implementation, the system memory 530 can be distinct from the memory 122 and the system data 536 can be communicated over a network.

The system memory 530 includes one or more applications 534 (e.g., sets of instructions) executable by the processor(s) 520. As an example, the one or more applications 534 include instructions executable by the processor(s) 520 to initiate, control, or perform one or more operations described with reference to FIGS. 1A-4. To illustrate, the one or more applications 534 include instructions executable by the processor(s) 520 to initiate, control, or perform one or more operations described with reference to the unmanned aerial vehicle 110.

In a particular implementation, the system memory 530 includes a non-transitory, computer readable medium (e.g., a computer-readable storage device) storing the instructions that, when executed by the processor(s) 520, cause the processor(s) 520 to initiate, perform, or control operations of the unmanned aerial vehicle 110. The operations include obtaining a flight plan (e.g., the flight plan 130) for an unmanned aerial vehicle (e.g., the unmanned aerial vehicle 110). The flight plan is based on an aircraft type (e.g., the aircraft type 312) of an aircraft (e.g., the aircraft 102) to be inspected. The operations also include coordinating, with a device (e.g., the lighting control device 150) onboard the aircraft, activation of a particular exterior light (e.g., the exterior light(s) 104) of the aircraft based on the flight plan such that the particular exterior light activates or deactivates when a particular sensor (e.g., the sensor(s) 126) is located to perform a sensing operation on the particular exterior light. The operations also include performing the sensing operation on the particular exterior light using the particular sensor. The operations further include determining a functionality metric (e.g., the functionality metric 134) associated with the particular exterior light based on the sensing operation.

The one or more storage devices 540 include nonvolatile storage devices, such as magnetic disks, optical disks, or flash (e.g. solid state) memory devices. In a particular example, the storage devices 540 include both removable and non-removable memory devices. The storage devices 540 are configured to store an operating system, images of operating systems, applications (e.g., one or more of the applications 534), and program data (e.g., the program data 536). In a particular aspect, the system memory 530, the storage devices 540, or both, include tangible computer-readable media. In a particular aspect, one or more of the storage devices 540 are external to the computing device 510.

The one or more input/output interfaces 550 enable the computing device 510 to communicate with one or more input/output devices 570 to facilitate user interaction. For example, the one or more input/output interfaces 550 can include a display interface, an input interface, or both. For example, the input/output interface 550 is adapted to receive input from a user, to receive input from another computing device, or a combination thereof. In some implementations, the input/output interface 550 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 570 includes one or more user interface devices and displays. The processor(s) 520 are configured to communicate with devices or controllers 580 via the one or more communications interfaces 560.

In some implementations, a non-transitory, computer readable medium stores instructions that, when executed by one or more processors 520, cause the one or more processors 520 to initiate, perform, or control operations to perform part or all of the functionality described above. For example, the instructions can be executable to implement one or more of the operations or methods of FIGS. 1A-4. In some implementations, part or all of one or more of the operations or methods of FIGS. 1A-4 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following examples:

Example 1

An unmanned aerial vehicle comprising: communication circuitry; one or more sensors; and one or more processors coupled to the communication circuitry and the one or more sensors, the one or more processors configured to: obtain a flight plan for the unmanned aerial vehicle, the flight plan based on an aircraft type of an aircraft to be inspected; coordinate, with a lighting control device onboard the aircraft via the communication circuitry, activation of a particular exterior light of the aircraft based on the flight plan such that the particular exterior light activates or deactivates when a particular sensor of the one or more sensors is located to perform a sensing operation on the particular exterior light; perform the sensing operation on the particular exterior light using the particular sensor; and determine a functionality metric associated with the particular exterior light based on the sensing operation.

Example 2

The unmanned aerial vehicle of Example 1, wherein, to coordinate activation of the particular exterior light based on the flight plan, the one or more processors are configured to: determine, based on the flight plan, that the particular sensor is located to perform the sensing operation on the particular exterior light; and in response to a determination that the particular sensor is located to perform the sensing operation on the particular exterior light, communicate, to the lighting control device onboard the aircraft via the communication circuitry, to activate the particular exterior light or deactivate the particular exterior light.

Example 3

The unmanned aerial vehicle of Example 1, wherein the particular sensor corresponds to a camera, and wherein the sensing operation corresponds to an image capture operation for capturing one or more images of the particular exterior light or a video capture operation.

Example 4

The unmanned aerial vehicle of any of Examples 1 to 3, wherein the functionality metric indicates whether the particular exterior light is functional.

Example 5

The unmanned aerial vehicle of any of Examples 1 to 4, wherein the particular sensor corresponds to a light intensity measuring sensor, and wherein the sensing operation corresponds to a light intensity measurement associated with the particular exterior light.

Example 6

The unmanned aerial vehicle of any of Examples 1 to 5, wherein the functionality metric indicates an intensity of the particular exterior light.

Example 7

The unmanned aerial vehicle of any of Examples 1 to 6, wherein, to coordinate activation of the particular exterior light based on the flight plan, the one or more processors are configured to: initiate a first flight around the aircraft based on the flight plan; communicate, to the lighting control device onboard the aircraft via the communication circuitry, to deactivate the particular exterior light during the first flight; initiate a second flight around the aircraft based on the flight plan after completion of the first flight; and communicate, to the lighting control device onboard the aircraft via the communication circuitry, to activate the particular exterior light during the second flight.

Example 8

The unmanned aerial vehicle of any of Examples 1 to 7, wherein the one or more processors are configured to: communicate, to the lighting control device onboard the aircraft via the communication circuitry, to deactivate two or more exterior lights of the aircraft during the first flight; perform the sensing operation on the two or more exterior lights using the particular sensor during the first flight; communicate, to the lighting control device onboard the aircraft via the communication circuitry, to activate the two or more exterior lights of the aircraft during the second flight; and perform the sensing operation on the two or more exterior lights using the particular sensor during the second flight.

Example 9

The unmanned aerial vehicle of any of Examples 1 to 8, wherein the particular sensor comprises a laser-based sensor, and wherein the sensing operation corresponds to a light refraction test.

Example 10

The unmanned aerial vehicle of any of Examples 1 to 9, wherein, to coordinate activation of the particular exterior light based on the flight plan, the one or more processors are configured to: determine, based on the flight plan, a time window when the particular sensor will be located to perform the sensing operation on the particular exterior light; and communicate, to the lighting control device onboard the aircraft via the communication circuitry, to activate the particular exterior light during the time window or deactivate the particular exterior light during the time window.

Example 11

The unmanned aerial vehicle of any of Examples 1 to 10, wherein the one or more processors are configured to: initiate a first flight around the aircraft based on the flight plan; communicate, to the lighting control device onboard the aircraft via the communication circuitry, to activate cabin lights of the aircraft during the first flight and to set an electronic window shade to a first transparency level; perform a first sensing operation on the electronic window shade during the first flight; initiate a second flight around the aircraft based on the flight plan; communicate, to the lighting control device onboard the aircraft via the communication circuitry, to set the electronic window shade to a second transparency level; perform a second sensing operation on the electronic window shade during the second flight; and determine a second functionality metric associated with the electronic window shade based on the first sensing operation and the second sensing operation.

Example 12

A method comprising: obtaining, by an unmanned aerial vehicle, a flight plan for the unmanned aerial vehicle, the flight plan based on an aircraft type of an aircraft to be inspected; coordinating, with a lighting control device onboard the aircraft, activation of a particular exterior light of the aircraft based on the flight plan such that the particular exterior light activates or deactivates when a particular sensor of the one or more sensors is located to perform a sensing operation on the particular exterior light; performing the sensing operation on the particular exterior light using the particular sensor; and determining a functionality metric associated with the particular exterior light based on the sensing operation.

Example 13

The method of Example 12, wherein obtaining the flight plan comprises receiving the flight plan from the lighting control device onboard the aircraft.

Example 14

The method of any of Examples 12 to 13, wherein obtaining the flight plan comprises receiving the flight plan from a remote computing device.

Example 15

The method of any of Examples 12 to 14, wherein coordinating the activation of the particular exterior light of the aircraft based on the flight plan comprises: determining, based on the flight plan, that the particular sensor is located to perform the sensing operation on the particular exterior light; and in response to a determination that the particular sensor is located to perform the sensing operation on the particular exterior light, communicating, to the lighting control device onboard the aircraft, to activate the particular exterior light or deactivate the particular exterior light.

Example 16

The method of any of Examples 14 to 15, wherein the particular sensor corresponds to a camera, and wherein the sensing operation corresponds to an image capture operation for capturing one or more images of the particular exterior light.

Example 17

A non-transitory computer-readable medium comprising instructions that, when executed by one or more processors, cause the one or more processors to: obtain a flight plan for an unmanned aerial vehicle, the flight plan based on an aircraft type of an aircraft to be inspected; coordinate, with a lighting control device onboard the aircraft, activation of a particular exterior light of the aircraft based on the flight plan such that the particular exterior light activates or deactivates when a particular sensor of the one or more sensors is located to perform a sensing operation on the particular exterior light; perform the sensing operation on the particular exterior light using the particular sensor; and determine a functionality metric associated with the particular exterior light based on the sensing operation.

Example 18

The non-transitory computer-readable medium of Example 17, wherein the instructions, when executed by the one or more processors, further cause the one or more processors to: determine, based on the flight plan, that the particular sensor is located to perform the sensing operation on the particular exterior light; and in response to a determination that the particular sensor is located to perform the sensing operation on the particular exterior light, communicate, to the lighting control device onboard the aircraft, to activate the particular exterior light or deactivate the particular exterior light.

Example 19

The non-transitory computer-readable medium of any of Examples 17 to 18, wherein the particular sensor corresponds to a camera, and wherein the sensing operation corresponds to an image capture operation for capturing one or more images of the particular exterior light.

Example 20

The non-transitory computer-readable medium of any of Examples 17 to 19, wherein, to coordinate activation of the particular exterior light based on the flight plan, the instructions, wherein executed by the one or more processors, cause the one or more processors to: initiate a first flight around the aircraft based on the flight plan; communicate, to the lighting control device onboard the aircraft, to deactivate the particular exterior light during the first flight; initiate a second flight around the aircraft based on the flight plan after completion of the first flight; and communicate, to the lighting control device onboard the aircraft via the communication circuitry, to activate the particular exterior light during the second flight.

What is claimed is:

1. An unmanned aerial vehicle comprising:
communication circuitry;
one or more sensors; and
one or more processors coupled to the communication circuitry and the one or more sensors, the one or more processors configured to:
  obtain a flight plan for the unmanned aerial vehicle, the flight plan based on an aircraft type of an aircraft to be inspected;
  coordinate, with a lighting control device onboard the aircraft via the communication circuitry, activation of a particular exterior light of the aircraft based on the flight plan such that the particular exterior light activates or deactivates when a particular sensor of the one or more sensors is located to perform a sensing operation on the particular exterior light, wherein to coordinate activation of the particular exterior light based on the flight plan, the one or more processors are configured to:
    determine, based on the flight plan, a particular time when the particular sensor will be located to perform the sensing operation on the particular exterior light; and
    communicate, to the lighting control device onboard the aircraft via the communication circuitry, to activate the particular exterior light at the particular time or deactivate the particular exterior light at the particular time;
  perform the sensing operation on the particular exterior light using the particular sensor; and
  determine a functionality metric associated with the particular exterior light based on the sensing operation.

2. The unmanned aerial vehicle of claim 1, wherein, to coordinate activation of the particular exterior light based on the flight plan, the one or more processors are configured to communicate, to the lighting control device onboard the aircraft, via the communication circuitry, to activate the particular exterior light at a second particular time or deactivate the particular exterior light at the second particular time, the second particular time corresponding to when the particular sensor will no longer be located to perform the sensing operation on the particular exterior light.

3. The unmanned aerial vehicle of claim 1, wherein the particular sensor corresponds to a camera, and wherein the sensing operation corresponds to an image capture operation for capturing one or more images of the particular exterior light or a video capture operation.

4. The unmanned aerial vehicle of claim 1, wherein the functionality metric indicates whether the particular exterior light is functional.

5. The unmanned aerial vehicle of claim 1, wherein the particular sensor corresponds to a light intensity measuring sensor, and wherein the sensing operation corresponds to a light intensity measurement associated with the particular exterior light.

6. The unmanned aerial vehicle of claim 5, wherein the functionality metric indicates an intensity of the particular exterior light.

7. The unmanned aerial vehicle of claim 1, wherein, to coordinate activation of the particular exterior light based on the flight plan, the one or more processors are configured to:
  initiate a first flight around the aircraft based on the flight plan;
  communicate, to the lighting control device onboard the aircraft via the communication circuitry, to deactivate the particular exterior light during the first flight;
  initiate a second flight around the aircraft based on the flight plan after completion of the first flight; and
  communicate, to the lighting control device onboard the aircraft via the communication circuitry, to activate the particular exterior light during the second flight, wherein the particular time corresponds to a beginning of the first flight or the second flight.

8. The unmanned aerial vehicle of claim 7, wherein the one or more processors are configured to:
  communicate, to the lighting control device onboard the aircraft via the communication circuitry, to deactivate two or more exterior lights of the aircraft during the first flight;
  perform the sensing operation on the two or more exterior lights using the particular sensor during the first flight;
  communicate, to the lighting control device onboard the aircraft via the communication circuitry, to activate the two or more exterior lights of the aircraft during the second flight; and
  perform the sensing operation on the two or more exterior lights using the particular sensor during the second flight.

9. The unmanned aerial vehicle of claim 1, wherein the particular sensor comprises a laser-based sensor, and wherein the sensing operation corresponds to a light refraction test.

10. The unmanned aerial vehicle of claim 1, wherein, to coordinate activation of the particular exterior light based on the flight plan, the one or more processors are configured to determine, based on the flight plan, a time window when the particular sensor will be located to perform the sensing operation on the particular exterior light, wherein the particular time corresponds to a beginning of the time window.

11. The unmanned aerial vehicle of claim 1, wherein the one or more processors are configured to:
  initiate a first flight around the aircraft based on the flight plan;
  communicate, to the lighting control device onboard the aircraft via the communication circuitry, to activate cabin lights of the aircraft during the first flight and to set an electronic window shade to a first transparency level;
  perform a first sensing operation on the electronic window shade during the first flight;
  initiate a second flight around the aircraft based on the flight plan;
  communicate, to the lighting control device onboard the aircraft via the communication circuitry, to set the electronic window shade to a second transparency level;
  perform a second sensing operation on the electronic window shade during the second flight, wherein the particular time corresponds to a beginning of the first flight or the second flight; and determine a second functionality metric associated with the electronic window shade based on the first sensing operation and the second sensing operation.

12. A method comprising:

obtaining, by an unmanned aerial vehicle, a flight plan for the unmanned aerial vehicle, the flight plan based on an aircraft type of an aircraft to be inspected;

coordinating, with a lighting control device onboard the aircraft, activation of a particular exterior light of the aircraft based on the flight plan such that the particular exterior light activates or deactivates when a particular sensor of one or more sensors is located to perform a sensing operation on the particular exterior light, wherein coordinating activation of the particular exterior light based on the flight plan includes:

determining, based on the flight plan, a particular time when the particular sensor will be located to perform the sensing operation on the particular exterior light; and communicating, to the lighting control device onboard the aircraft via communication circuitry, to activate the particular exterior light at the particular time or deactivate the particular exterior light at the particular time;

performing the sensing operation on the particular exterior light using the particular sensor; and determining a functionality metric associated with the particular exterior light based on the sensing operation.

13. The method of claim 12, wherein obtaining the flight plan comprises receiving the flight plan from the lighting control device onboard the aircraft.

14. The method of claim 12, wherein obtaining the flight plan comprises receiving the flight plan from a remote computing device.

15. The method of claim 12, wherein coordinating the activation of the particular exterior light of the aircraft based on the flight plan further comprises communicating, to the lighting control device onboard the aircraft via the communication circuitry, to activate the particular exterior light at a second particular time or deactivate the particular exterior light at the second particular time, the second particular time corresponding to when the particular sensor will no longer be located to perform the sensing operation on the particular exterior light.

16. The method of claim 12, wherein the particular sensor corresponds to a camera, and wherein the sensing operation corresponds to an image capture operation for capturing one or more images of the particular exterior light.

17. A non-transitory computer-readable medium comprising instructions that, when executed by one or more processors, cause the one or more processors to:

obtain a flight plan for an unmanned aerial vehicle, the flight plan based on an aircraft type of an aircraft to be inspected;

coordinate, with a lighting control device onboard the aircraft, activation of a particular exterior light of the aircraft based on the flight plan such that the particular exterior light activates or deactivates when a particular sensor of one or more sensors is located to perform a sensing operation on the particular exterior light, wherein coordinating activation of the particular exterior light based on the flight plan causes the one or more processors to:

determine, based on the flight plan, a particular time when the particular sensor will be located to perform the sensing operation on the particular exterior light; and communicate, to the lighting control device onboard the aircraft via communication circuitry, to activate the particular exterior light at the particular time or deactivate the particular exterior light at the particular time;

perform the sensing operation on the particular exterior light using the particular sensor; and determine a functionality metric associated with the particular exterior light based on the sensing operation.

18. The non-transitory computer-readable medium of claim 17, wherein the instructions, when executed by the one or more processors, further cause the one or more processors to communicate, to the lighting control device onboard the aircraft via the communication circuitry, to activate the particular exterior light at a second particular time or deactivate the particular exterior light at the second particular time, the second particular time corresponding to when the particular sensor will no longer be located to perform the sensing operation on the particular exterior light.

19. The non-transitory computer-readable medium of claim 17, wherein the particular sensor corresponds to a camera, and wherein the sensing operation corresponds to an image capture operation for capturing one or more images of the particular exterior light.

20. The non-transitory computer-readable medium of claim 17, wherein, to coordinate activation of the particular exterior light based on the flight plan, the instructions, wherein executed by the one or more processors, cause the one or more processors to:

initiate a first flight around the aircraft based on the flight plan;

communicate, to the lighting control device onboard the aircraft, to deactivate the particular exterior light during the first flight;

initiate a second flight around the aircraft based on the flight plan after completion of the first flight; and communicate, to the lighting control device onboard the aircraft, to activate the particular exterior light during the second flight, wherein the particular time corresponds to a beginning of the first flight or the second flight.

* * * * *